(12) United States Patent
Robinson et al.

(10) Patent No.: US 8,292,553 B2
(45) Date of Patent: Oct. 23, 2012

(54) DEBURRING TOOL AND CUTTING INSERT

(75) Inventors: William A. Robinson, South Lyon, MI (US); James R. Robinson, Howell, MI (US)

(73) Assignee: E-Z Burr Tool Company, Plymouth, MI (US)

( * ) Notice: Subject to any disclaimer, the term of this patent is extended or adjusted under 35 U.S.C. 154(b) by 715 days.

(21) Appl. No.: 12/480,026

(22) Filed: Jun. 8, 2009

(65) Prior Publication Data

US 2009/0304470 A1  Dec. 10, 2009

Related U.S. Application Data

(60) Provisional application No. 61/059,542, filed on Jun. 6, 2008.

(51) Int. Cl.
*B23B 51/00* (2006.01)

(52) U.S. Cl. ........ 408/156; 408/180; 408/181; 408/713; 408/714

(58) Field of Classification Search ................... 408/156, 408/180, 181, 211, 713, 714
See application file for complete search history.

(56) References Cited

U.S. PATENT DOCUMENTS

| | | | | |
|---|---|---|---|---|
| 3,087,359 A * | 4/1963 | Cogsdill | ........................ | 408/147 |
| 3,298,256 A * | 1/1967 | Cogsdill | ........................ | 408/226 |
| 3,521,507 A * | 7/1970 | Yogus et al. | ................... | 408/199 |
| 3,590,671 A * | 7/1971 | Wahli | ............................ | 408/199 |
| 4,147,463 A * | 4/1979 | Robinson | ..................... | 408/156 |
| 4,844,670 A * | 7/1989 | Heule | ........................... | 408/224 |
| 5,135,338 A * | 8/1992 | Heule | ........................... | 408/187 |
| 5,181,810 A * | 1/1993 | Heule | ........................... | 408/147 |
| 5,209,617 A | 5/1993 | Heule | | |
| 5,277,528 A | 1/1994 | Robinson | | |
| 5,288,184 A | 2/1994 | Heule | | |
| 5,358,363 A * | 10/1994 | Robinson | ..................... | 408/153 |
| 5,755,538 A * | 5/1998 | Heule | ........................... | 408/154 |
| 5,803,679 A | 9/1998 | Heule | | |
| 6,499,917 B1 * | 12/2002 | Parker et al. | ..................... | 407/25 |
| 6,533,505 B1 | 3/2003 | Robinson | | |
| 6,997,655 B2 * | 2/2006 | Robinson | ..................... | 408/156 |
| 7,011,477 B2 | 3/2006 | Hecht | | |
| 7,172,373 B2 | 2/2007 | Heule | | |
| 7,261,498 B2 * | 8/2007 | Hecht et al. | ................... | 408/154 |
| 7,273,334 B2 | 9/2007 | Heule | | |
| 7,322,776 B2 * | 1/2008 | Webb et al. | ..................... | 407/113 |
| 7,360,972 B2 * | 4/2008 | Sjogren | ........................... | 407/67 |
| 7,364,389 B2 | 4/2008 | Robinson | | |

FOREIGN PATENT DOCUMENTS

EP   519233 A1 * 12/1992

* cited by examiner

*Primary Examiner* — Eric A Gates

(74) *Attorney, Agent, or Firm* — Reising Ethington P.C.

(57) ABSTRACT

An insert for a deburring tool is used to machine openings of bores that are formed in metal work pieces. In an exemplary embodiment, the insert has an inward portion, a central portion connected to the inward portion, and an outward portion connected to the central portion. The central portion has a dovetail-shaped retaining feature that attaches the insert to the deburring tool.

21 Claims, 3 Drawing Sheets

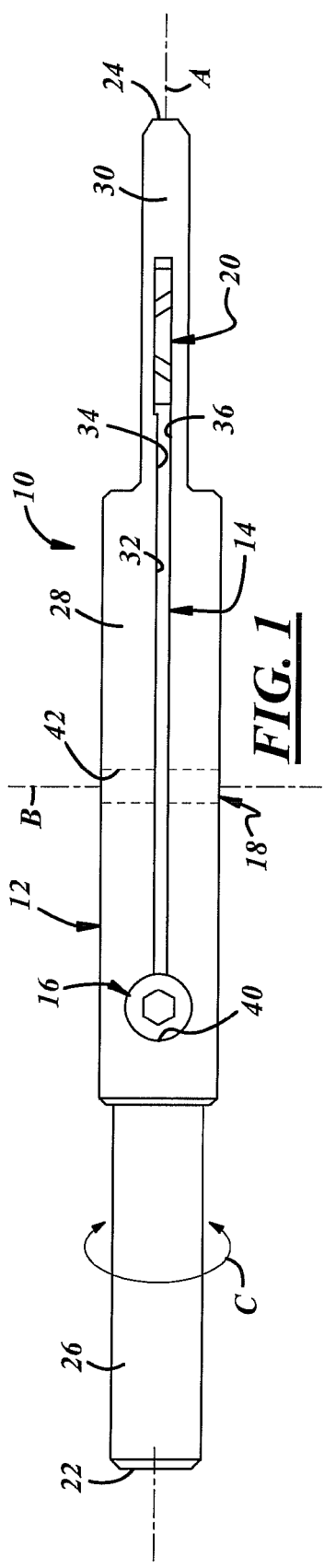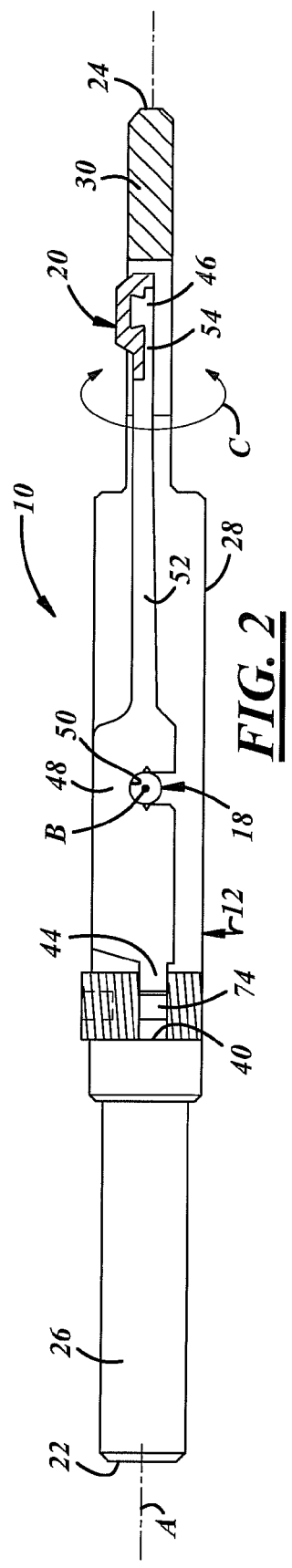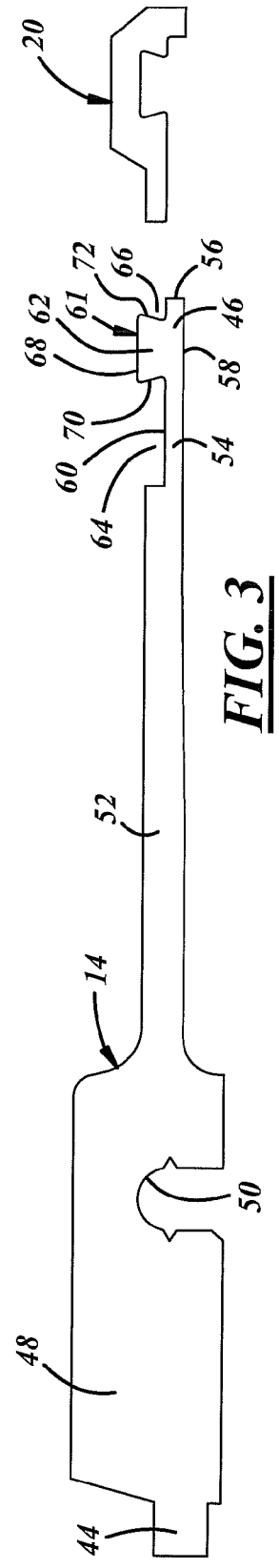

DEBURRING TOOL AND CUTTING INSERT

REFERENCE TO RELATED APPLICATIONS

This application claims the benefit of U.S. Provisional Ser. No. 61/059,542 filed Jun. 6, 2008.

TECHNICAL FIELD

The present invention generally relates to deburring tools and, more particularly to deburring tools that have cutting inserts.

BACKGROUND

Deburring tools are used to remove burrs or place chamfers on bores of workpieces such as automotive internal combustion engines and jet engines, for example. The deburring tools commonly include cutting inserts that perform the particular material working process upon rotation, and advance and reverse movements of the inserts in and out of the workpiece bores. During use, countless forces act on the cutting inserts which can cause the inserts to become worn, damaged, or cause them to be inadvertently dislodged from the deburring tools. Any of these occurrences can require replacement of the cutting inserts.

SUMMARY

According to one embodiment, there is provided an insert for a deburring tool. The insert may have an inward portion, a central portion connected to the inward portion, and an outward portion connected to the central portion. The central portion has a dovetail-shaped retaining feature that is used to attach the insert to the deburring tool.

According to another embodiment, there is provided an insert for a deburring tool. The insert may have a peripheral surface, a cutting edge, and an attachment surface. The peripheral surface extends around the outside of the insert. The cutting edge extends along a first section of the peripheral surface and is positioned to contact a workpiece bore to machine the workpiece bore during operation of the deburring tool. The attachment surface extends along a second section of the peripheral surface and is positioned to mate with a component of the deburring tool. A contact interface is formed between the attachment surface and the component. An overall length ($L_5$) of the attachment surface is greater than an overall axial length ($L_4$) of the insert.

According to another embodiment, there is provided a connection assembly for a deburring tool. The connection assembly may include an insert and a connection arm. The insert has one or more cutting edges and a first retaining feature. The first retaining feature has a first side, a first sloped side that extends from the first side, and a second sloped side that extends from the first side. The connection arm has a second retaining feature that mates with the first retaining feature in order to attach the insert to the connection arm. The second retaining feature has a second side, a third sloped side that extends from the second side, and a fourth sloped side that extends from the second side. When the first and second retaining features are mated together, the first and second sides confront each other, the first and third sloped sides confront each other, and the second and fourth sloped sides confront each other.

BRIEF DESCRIPTION OF THE DRAWINGS

These and other objects, features and advantages of this invention will be apparent from the following detailed description of the preferred embodiments and best mode, the appended claims, and the accompanying drawings, in which:

FIG. 1 is a top view of an exemplary embodiment of a deburring tool having a cutting insert;

FIG. 2 is a partially sectioned side view of the deburring tool of FIG. 1;

FIG. 3 is a side view of exemplary embodiments of a connection arm and a cutting insert that can be used with the deburring tool of FIG. 1;

DETAILED DESCRIPTION OF THE PREFERRED EMBODIMENTS

Figure 4:
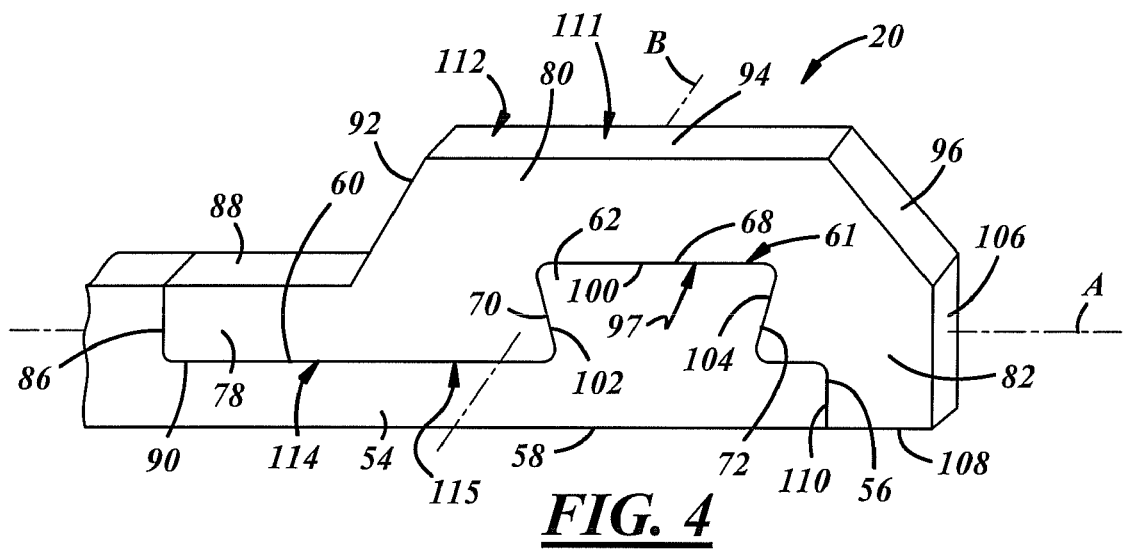
FIG. 4 is an enlarged perspective view of the cutting insert of FIG. 3 mounted on a connection arm.

The deburring tool described herein may be used to remove burrs or otherwise machine the edges of a bore or other opening formed in a workpiece. For example, the deburring tool can be used to process workpieces like automotive and aerospace components such as those found in internal combustion engines and jet engines, to cite a few examples. These types of workpieces are sometimes made from high strength materials, such as the Ni-based alloy Inconel® as well as other metals and metal alloys, that can exert a lot of wear-and-tear on deburring and other machining tools.

Deburring tool 10 may come in many embodiments, including those with more, less, or different components than the examples shown and described below. According to one embodiment, deburring tool 10 includes an arbor 12, a connection or resilient arm 14, a mounting pin 16, a pivot pin 18, and a cutting insert 20. Deburring tool 10 has a generally cylindrical shape which naturally defines a longitudinal axis A, an imaginary radial line B (radial line B can extend in any direction that is generally perpendicular to axis A and does not have to be the exemplary line shown here), and an imaginary circumference C. In this regard, the term "axially" describes a direction that generally corresponds to imaginary longitudinal axis A, the term "radially" describes a direction that generally corresponds to imaginary radial line B, and the term "circumferentially" describes a direction that generally corresponds to imaginary circumference C. These terms are simply used for illustrative purposes and can also apply to deburring tools having other non-cylindrical shapes.

Turning now to FIGS. 1 and 2, arbor 12 carries the various deburring tool components and provides means for securing the deburring tool into a chuck or spindle of a machine. According to the exemplary embodiment here, arbor 12 extends from a first terminal axial end 22 to a second terminal axial end 24 and includes a shank portion 26, a body portion 28, a working portion 30, an elongated slot 32, a mounting pin bore 40, and a pivot pin bore 42. Shank portion 26 is received in the chuck, and body portion 28 supports parts of resilient arm 14, mounting pin 16, and pivot pin 18. Working portion 30 is inserted in and out of the workpiece bore when in use, and houses part of cutting insert 20. Slot 32 axially extends from body portion 28 to working portion 30 and is preferably sized to accommodate resilient arm 14 and cutting insert 20 so they can pivot during operation. A pair of interior parallel walls bound slot 32 and have a respective first surface 34 and second surface 36. The distance between first surface 34 and second surface 36—i.e., the width of slot 32—may be slightly greater than the width of resilient arm 14 to accommodate pivotal movement but prevent debris and shavings from entering between the slot and the resilient arm. Mounting pin bore 40 extends in a radial direction and is internally threaded to receive mounting pin 16. Pivot pin bore 42 also extends in a radial direction, but is unthreaded and receives pivot pin 18. Although not shown, a cutting recess may be formed in slot 32 near second terminal axial end 24 and on the leading rotational side of arbor 12 (i.e., in the direction of cutting rotation). The cutting recess could be an enlarged portion of slot 32 that prevents debris and shavings created during use from becoming wedged between the slot and cutting insert 20.

Resilient arm 14 is a connecting structure that carries cutting insert 20 and is coupled, directly or indirectly, to arbor 12. In the exemplary embodiment of FIGS. 1-4, resilient arm 14 is a one-piece structure that extends from a proximal end 44 to a distal end 46, and includes a body portion 48, a pivot recess 50, a flexible arm portion 52, and an attachment end 54. Body portion 48 is the widest part of resilient arm 14 and does not easily flex. Pivot recess 50 is a cutout that receives pivot pin 18. Flexible arm portion 52 extends from body portion 48 and has a reduced width as compared to the body portion which permits the flexible arm portion to bend so that cutting insert 20 can move radially in and out of slot 32 during use.

Attachment end 54 is constructed to removably carry cutting insert 20. In other words, attachment end 54 is designed such that when assembled, cutting insert 20 is firmly retained on the attachment end and cannot be easily detached during use. However, cutting insert 20 can, when being replaced, slide off of attachment end 54 in a generally radial direction B. The exact structure and dimensions of attachment end 54 will depend on, among other things, the structure and dimensions of cutting insert 20; put differently, the structure of the attachment end may vary. In the exemplary embodiment of FIGS. 1-4, attachment end 54 has a terminal end surface 56, a radially inboard surface 58, a radially outboard surface 60, and a retaining feature 61. Terminal end surface 56 constitutes the axially outermost end of attachment end 54, with reference to proximal end 44. Radially inboard surface 58 lies perpendicular to terminal end surface 56 and spans the axial length of attachment end 54. In this particular embodiment, radially inboard surface 58 constitutes the underside of attachment end 54. Radially outboard surface 60 lays opposite surface 58 and, in this example, forms a shallow pocket in resilient arm 14 that helps maintain the cutting insert in place. Retaining feature 61 is located adjacent radially outboard surface 60 and is designed to form a nonpermanent interlock between attachment end 54 and cutting insert 20. Retaining feature 61 may come in various shapes and sizes to attach cutting insert 20 to attachment end 54, including the dovetail-shaped projection 62 that is shown in the drawings and is located between an attachment recess 64 and an attachment space 66 that is located at the terminal end of the resilient arm 14. Projection 62 includes a top side 68, a first sloped side 70, and a second sloped side 72.

Dovetail-shaped, as used herein, broadly refers to the general shape of a dovetail or a shape resembling a dovetail and my form a nonpermanent interlock with a complementarily-shaped structure, but does not require the exact shape of a dovetail or the exemplary shapes shown in the figures. For example, dovetail-shaped may include both male and female structures, may have sides sloped at different angles with respect to one another, may have slides that extend at right angles from an adjacent surface, and may include more than three sides, to cite a few possibilities.

Mounting pin 16 is inserted in mounting pin bore 40 to adjustably connect resilient arm 14 to arbor 12. In the exemplary embodiment shown here, an upper and a lower portion of mounting pin 16 is threaded, while a center portion 74 is unthreaded and is diametrically reduced as compared to the threaded portions. When assembled, proximal end 44 of resilient arm 14 is captured within center portion 74 such that adjusting mounting pin 16 affects the degree of deflection at pivot pin 18 and positions cutting insert 20 radially in slot 32 when at a resting or cutting position.

Pivot pin 18 is inserted into pivot pin bore 42 and defines a pivot axis about which resilient arm 14 bears against and bends when in use. As best seen in FIG. 2, pivot pin 18 is received in pivot recess 50 of resilient arm 14, and may form an interlocking engagement therebetween as described in U.S. Pat. No. 6,533,505 issued to Robinson.

Cutting insert 20 is designed to machine the circumferential edges of a workpiece bore in order to remove burrs, form chamfers, or perform any other machining tasks known in the art. With reference to the exemplary embodiment shown in FIGS. 4-6, cutting insert 20 is designed to minimize the amount of material used for the cutting insert while maintaining certain attributes such as the structural integrity and force distribution requirements for use. Together, cutting insert 20 and resilient arm 14 constitute a connection assembly that can be coupled to arbor 12. Cutting insert 20 can be composed of a high-strength, wear-resistant material that is suitable for deburring, chamfering, shearing, and otherwise machining metal and other workpieces. For example, carbide-based materials could be used. Cutting insert 20 has an axially inward portion 78, a central portion 80 connected to the inward portion, and an axially outward portion 82 connected to the central portion. Axially inward portion 78 projects in the axial direction and includes an axially inward surface 86, a radially outward surface 88, and a radially inward surface 90. According to this particular embodiment, axially inward portion 78 is an elongated leg-shaped structure that is designed to nest within attachment recess 64 so that an interface of considerable axial length exists between cutting insert 20 and resilient arm 14; the interface between these two parts can contribute to the structural integrity and force distribution attributes of the connection assembly. The exact dimensions of axially inward portion 78 may vary and may depend on a number of factors. As best demonstrated in FIG. 5, exemplary portion 78 can have an axial length $L_1$ of about 0.05-0.10 inches and a radial height $H_1$ (measured between radially outward surface 88 and radially inward surface 90) of about 0.02-0.04 inches. Of course, these are just exemplary dimensions, as the cutting insert is not limited to these particular dimensions and could be of a different shape and/or size.

Figure 5:
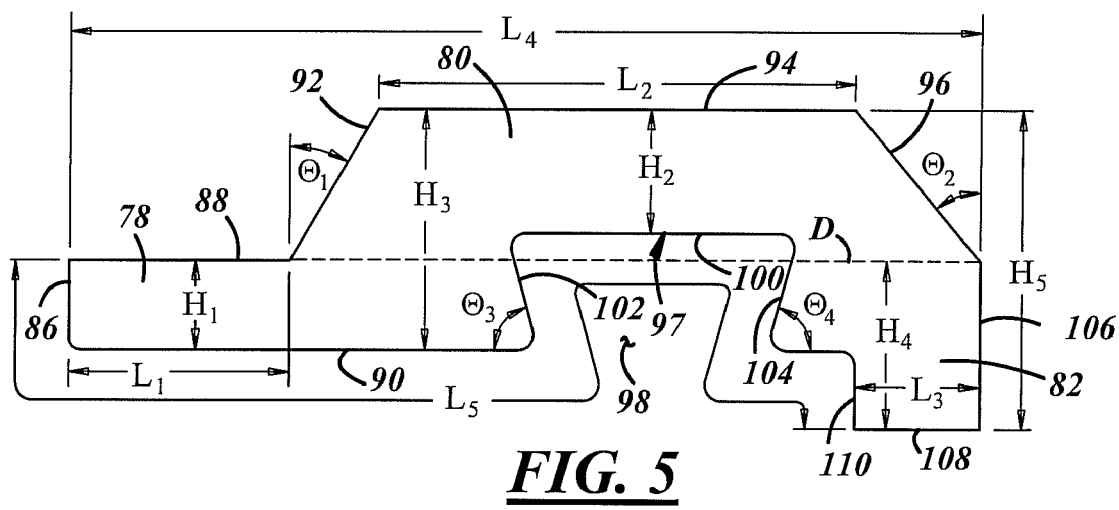
FIG. 5 is an enlarged side view of the cutting insert of FIG. 3.

Central portion 80 includes a first or rearward cutting edge 92, a crown or top edge 94, a second or forward cutting edge 96, and a retaining feature 97. In use, rearward cutting edge 92 machines the back side opening of the workpiece bore and may be angled at various degrees. In the example of FIG. 5, the rearward cutting edge defines an angle $\Theta_1$ of about 25-35° with respect to an imaginary vertical axis as shown. Top edge 94 extends from rearward cutting edge 92 and can be polished and slightly rounded so that it does not score or otherwise damage the interior surface of the workpiece bore as cutting insert 20 is passing through it during use. While top edge 94 may have various lengths, in this example, the top edge has an axial length $L_2$ (measured axial distance between rearward and forward cutting edges 92, 96) of about 0.125-0.175 inches. The forward cutting edge 96 works or machines the front side opening of the workpiece bore and, like the rearward cutting edge, may be angled at various degrees. In this example, the forward cutting edge defines an angle $\Theta_2$ of about 35-45° with respect to an imaginary vertical axis as shown. In this particular example, central portion 80 has a radial height $H_2$ (measured radial distance between top edge 94 and retaining feature 97) of about 0.025-0.075 inches, and a radial height $H_3$ (measured radial distance between top edge 94 and radially inward surface 90) of about 0.05-0.1 inches.

Retaining feature 97 is complementary in shape and size to retaining feature 61 and mates therewith to attach cutting insert 20 to resilient arm 14. In one exemplary embodiment, the dimensional tolerance between retaining features 97, 61 is non-existent or very small in order to form an interference fit between the features, making it difficult to inadvertently detach cutting insert 20 from resilient arm 14. Retaining feature 97 may come in various shapes and sizes to accomplish this nonpermanent interlock, including a dovetail-shaped configuration that bounds or defines recess 98. Recess 98 is complementary in shape to projection 62 and has a bottom side 100 that is parallel to top edge 94, a third sloped side 102 extending from the bottom side, and a fourth sloped side 104 extending from the bottom side. Third and fourth sloped sides 102, 104 may be angled at various degrees and, in this particular example, the third and fourth sloped sides define angles $\Theta_3$ and $\Theta_4$ with respect to their immediately adjacent sides of about 70-80°. The corresponding angles of first sloped side 70 and second sloped side 72 may be similar but need not be the same; though if, for example, the difference between the first sloped side and the third sloped side is too great, an adequate nonpermanent interlock may not be formed whereby cutting insert 20 could be detached from the attachment end 56 during use.

Axially outward portion 82 may serve as an end cap that fits over terminal end surface 56 of the resilient arm 14. Axially outward portion 82 includes an axially outward surface 106, a second radially inward surface 108, and a second axially inward surface 110. Axially outward surface 106 constitutes the axially outermost extending surface of cutting insert 20, and second axially inward surface 110 overlaps terminal end surface 56. Axially outward portion 82 fits over top of the terminal end of resilient arm 14 and contributes to the structural integrity and force distribution attributes of cutting insert 20. Indeed, like the other portions, the exact dimensions of axially outward portion 82 may vary according to a number of factors but, in a particular example, are has an axial length $L_3$ (measured distance between axially outward surface 106 and second axially inward surface 110) of about 0.03-0.05 inches.

Figure 6:
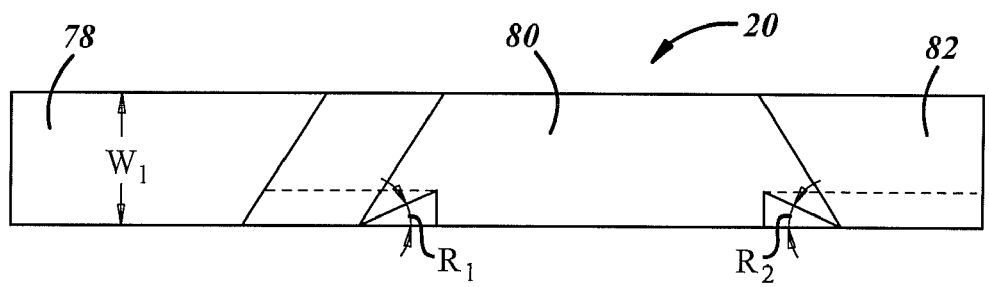
FIG. 6 is an enlarged top view of the cutting insert of FIG. 3.

Referring to the exemplary embodiment of FIG. 6, a first rake angle $R_1$ and a second rake angle $R_2$ may be formed proximate the respective rearward cutting edge 92 and forward cutting edge 96 to sharpen the cutting edges and promote improved machining. Although they are optional, the first and second rake angles can be particularly useful in applications where the bore being machined is small in diameter. Rake angles $R_1$, $R_2$ extend along an edge of the respective cutting edge on the trailing rotational side of cutting insert 20.

A peripheral surface 111 extends all the way around the outside of the cutting insert and constitutes the external boundary or perimeter surface of the cutting insert. Peripheral surface 111 can be divided into a number of smaller sections or surfaces, including a radially outboard surface 112 and a radially inboard surface 114. Radially outboard surface 112 generally extends the length of cutting insert 20 and includes radially outward surface 88, rearward cutting edge 92, top edge 94, and forward cutting edge 96, and does not form an interface with resilient arm 14. Radially inboard surface 114, on the other hand, generally spans the length of cutting insert 20 and includes radially inward surface 90, third sloped side 102, bottom side 100, fourth sloped side 104, second axially inward surface 110, the surface extending between the fourth sloped side and the second axially inward surface, and second radially inward surface 108. An attachment surface 115 of the cutting insert includes the surfaces and sides of peripheral surface 111 that directly confront surfaces of attachment end 54 when insert 20 is attached thereto—namely, axially inward surface 86, radially inward surface 90, third sloped side 102, bottom side 100, fourth sloped side 104, second axially inward surface 110, and the surface extending between the fourth sloped side and the second axially inward surface. An overall length $L_5$ of attachment surface 115 is a measured distance along the various surfaces and sides from axially inward surface 86 to second radially inward surface 108, inclusive. And although the exact lateral width of cutting insert 20 may vary, in the example of FIG. 6, the cutting insert has a lateral width $W_1$ (measured distance between front and back face of cutting insert 20) of about 0.03-0.06 inches.

Other dimensions of cutting insert 20 include a contact interface, a radial height $H_4$ (measured distance between second radially inward surface 108 and an arbor line D), and an overall radial height $H_5$ (measured distance between top edge 94 and second radially inward surface 108). The contact interface is formed at a common surface boundary between cutting insert 20 and attachment end 54. Referring to FIGS. 2 and 4, the contact interface includes axially inward surface 86, radially inward surface 90, third sloped side 102, bottom side 100, fourth sloped side 104, second axially inward surface 110, and the surface extending between the fourth sloped side and the second axially inward surface, and the opposing surfaces and sides of attachment end 54 of resilient arm 14. The contact interface has an overall length $L_5$, similar to that of attachment surface 115. In some embodiments the greater the extent of the contact interface, the greater the connection between the cutting insert and the resilient arm; thus, it may be advantageous to increase the length of extent of this contact interface. For instance, during operation a variety of forces can be exerted against cutting insert 20 and can dislodge the cutting insert from the resilient arm. A contact boundary arrangement, such as that shown in FIG. 4, can be used to improve this connection so that the cutting insert does not inadvertently separate during operation. In the example of FIG. 5, the overall length $L_5$ can measure about 0.2-1.0 inch.

Arbor line D represents an extension of the outer surface of arbor 12 when the cutting insert is in an unbiased position (i.e., when the cutting insert is not being forced into slot by the interior walls of the workpiece bore, etc.). It also divides cutting insert 20 into a portion that is exposed out of arbor 12 (above arbor line D) when in the unbiased position, and into a portion that is hidden in the arbor (below arbor line D) when in the unbiased position. Although the exact value of radial height $H_4$ may vary, it can be preferable to have a significant amount of cutting insert located below arbor line D in order to improve the ability of cutting insert 20 to withstand forces during use. Put differently, if too much of cutting insert 20 were located outside of the arbor, cutting insert 20 could break off or otherwise become separated from the resilient arm. In particular, a majority of axially inward portion 78 and axially outward portion 82 are located below arbor line D, while a majority of central portion 80 is located above the arbor line. In this exemplary embodiment, the radial height $H_4$ has a value of about 0.04-0.07 inches. Overall radial height $H_5$, on the other hand, is formed between top edge 94 and second radially inward surface 108. Though the exact value of total radial height $H_5$ may vary, in the example of FIG. 5, the total radial height is about 0.075-0.135 inches.

Testing has shown that some cutting insert designs resist damage better and last longer than other designs, while costing less by minimizing the material usage for the more expensive cutting insert material. Put differently, some cutting insert designs are better than others at withstanding the myriad forces acting upon the cutting insert during use. The exemplary embodiments of FIGS. 1-6 are such designs. Testing has also shown that the following design relationships can contribute to the structural integrity and longevity of a cutting insert. For example, providing a cutting insert that is generally axially longer than it is radially tall may be beneficial. As shown in the exemplary figures, cutting insert 20 is greater in overall axial length $L_4$ than it is in overall radial height $H_5$; this creates a contact interface between the cutting insert and resilient arm that is significant when compared to the amount of cutting insert material protruding out of the slot (if the cutting insert material protruding out of the slot is too great, forces acting against that material could cause it to snap off or otherwise be damaged). Also, it can be helpful if the overall length $L_5$ of attachment surface 115 is greater than the overall axial length $L_4$ and greater than the total radial height $H_5$. These relationships correspond to the exemplary embodiments and improve the robustness of the cutting insert by, among other things, locating much of the cutting insert material below the arbor line D (i.e., inside of arbor 12). In this way, it is more difficult for protruding or exposed portions of the cutting insert to break off due to operational forces acting against the cutting insert. It should, of course, be appreciated that the preceding relationships are simply some of the exemplary relationships that could be embodied by the cutting insert. It is certainly possible to provide a cutting insert having more, less, or different relationships than those just described.

Figure 7:
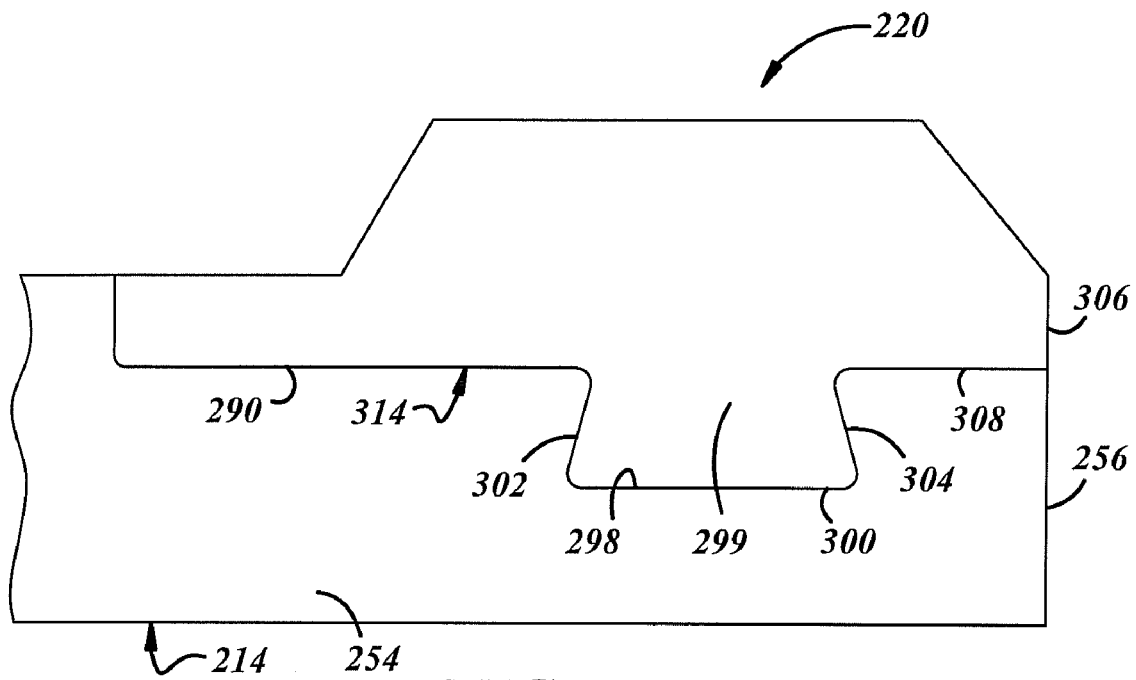
FIG. 7 is a perspective view of a second exemplary embodiment of a connection arm and cutting insert.

FIG. 7 shows an exemplary second embodiment of a cutting insert 220. Cutting insert 220 is similar in some ways to cutting insert 20 of the first exemplary embodiment, except this embodiment uses a retaining feature that is a dovetail-shaped projection instead of a dovetail-shaped recess. A second radially inboard surface 314 has a profile that forms a projection 299 located between a radially inward surface 290 and a second radially inward surface 308. The retaining feature may come in other shapes that form a nonpermanent interlock between an attachment end 254 of a resilient arm 214 and cutting insert 220. Attachment end 254 includes a retaining feature that complements second radially inboard surface 314; in this case, that retaining feature is a dovetail-shaped recess 298. Projection 299 has a bottom side 300, a third sloped side 302, and a fourth sloped side 304. Attachment end 254 has a terminal end surface 256 that is flush with an axially outward surface 306 of cutting insert 220. It should be recognized, however, that these two surfaces do not need to be flush, as one could extend beyond the other. The relationships described above in the first exemplary embodiment may also hold true in this embodiment to provide a cutting insert with similar damage resistance and longevity.

Figure 8:
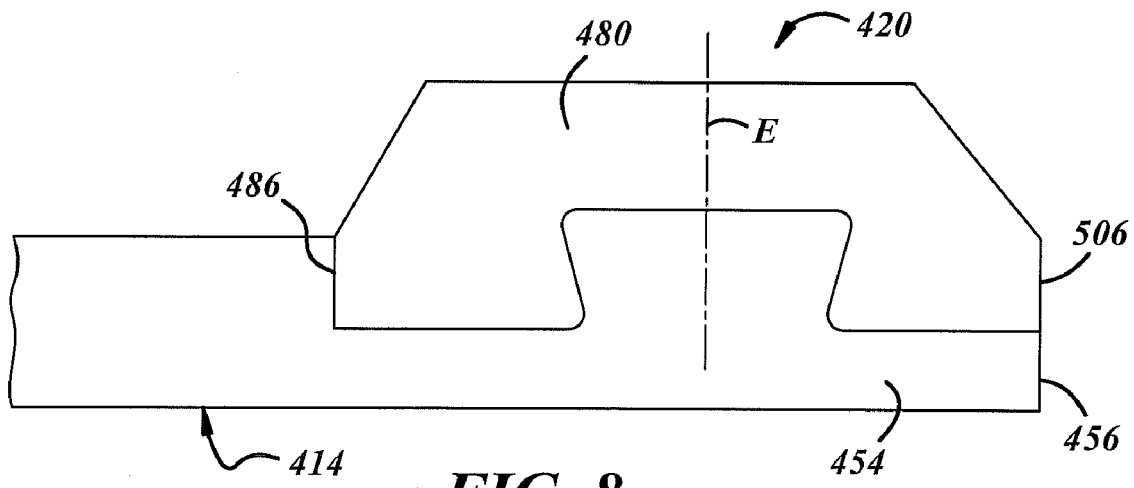
FIG. 8 is a side view of a third exemplary embodiment of a connection arm and cutting insert.

FIG. 8 shows an exemplary third embodiment of a cutting insert 420. Cutting insert 420 is similar in some ways to cutting insert 20 of the first exemplary embodiment, except that this cutting insert is generally symmetric in nature (cutting insert 20 is asymmetric). In this embodiment, an axially inward surface 486 extends from a central portion 480, and an axially outward surface 506 is flush with a terminal end surface 456 of an attachment end 454 of a resilient arm 414. With this design and construction, cutting insert 420 is symmetrical about a radial line of reflection E, which goes through central portion 480. The relationships described above in the first exemplary embodiment may also hold true in this embodiment to provide a cutting insert with similar damage resistance and longevity.

In operation, deburring tool 10 is installed in a machine and is rotated while advancing and reversing the deburring tool axially in and out of a workpiece bore. Doing so may remove burrs and place chamfers on the circumferential edges located on the front and back sides of the workpiece bore. Once working portion 30 is inserted into the workpiece bore, axial advancement brings forward cutting edge 96 into contact with a circumferential edge of a front side bore opening. Further advancement of deburring tool 10 brings top edge 94 into contact with the interior surface of the workpiece bore. The interior surface of the bore exerts a radially inward force against cutting insert 20, which causes resilient arm 14 to flex about pivot pin 18 and moves the cutting insert from its unbiased position to a biased or retracted noncutting position substantially within arbor 12. Once deburring tool 10 is advanced positionally through the bore so that the cutting insert can flex out of the arbor to its original unbiased position, advancing movement is stopped and reversing movement is commenced. Reversing brings rearward cutting edge 92 into contact with a backside opening of the bore, and the rearward cutting edge machines this surface in a manner that is similar to forward cutting edge 96. Further reversing causes cutting insert 20 to retract within the arbor, as previously described.

After a number of operations, cutting insert 20 can become worn or damaged and can require replacement. To do so, pivot pin 18 is unlocked to release resilient arm 14 and permit it to freely hinge at mounting pin 16. Once pivoted out of slot 32 and accessible to a user, cutting insert 20 can be slid off of attachment end 54 in a radial or lateral direction. Another cutting insert can then be slid onto and press-fit on attachment end 54. Resilient arm 14 can then be swung back into slot 32 and locked in place with pivot pin 18. In the unbiased position, cutting insert 20 is retained on the resilient arm 14 between first and second surfaces 34, 36 of the slot. First and second surfaces 34, 36 prevent lateral movement of cutting insert 20 during operation.

Though the exemplary embodiments of the cutting insert have been described and shown in some detail with a particular deburring tool, it is to be appreciated that the cutting inserts can be used with deburring tools of different constructions, configurations, and functionalities. For instance, the cutting insert can be coupled to various connection arms that retract in and extend from the particular arbor in various ways, and need not necessarily flex about a pivot as described.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance" and "such as," and the verbs "comprising," "having," "including," and their other verb forms, when used in conjunction with a listing of one or more components or other items, are each to be construed as openended, meaning that that the listing is not to be considered as excluding other, additional components or items. Other terms are to be construed using their broadest reasonable meaning unless they are used in a context that requires a different interpretation.

The invention claimed is:

1. An insert for a deburring tool, comprising:
an inward portion having a thin elongated leg-shaped structure;
a central portion being connected to the inward portion; and
an outward portion being connected to the central portion, wherein the central portion has a dovetail-shaped retaining feature that is sized and shaped to mate with a complementarily-shaped retaining feature that is part of a flexible connection arm pivotally connected to the deburring tool so that the dovetail-shaped retaining feature attaches the insert to the flexible connection arm.

2. The insert of claim 1, wherein the inward portion is located axially inward of the central portion.

3. The insert of claim 1, wherein the dovetail-shaped retaining feature is shaped and sized to mate via an interference fit with the complementarily-shaped retaining feature that is part of the flexible connection arm of the deburring tool.

4. The insert of claim 1, wherein the central portion comprises:
a rearward cutting edge that machines a back side opening of a workpiece bore;
a forward cutting edge that machines a front side opening of the workpiece bore; and
a crown located between the rearward and forward cutting edges that does not machine the workpiece bore, wherein the cutting edges and crown are located on an opposite side of the central portion than the retaining feature.

5. The insert of claim 4, wherein a first rake angle is formed proximate the rearward cutting edge and a second rake angle is formed proximate the forward cutting edge.

6. The insert of claim 1, wherein the outward portion is located axially outward of the central portion and fits over a terminal end of the flexible connection arm of the deburring tool.

7. The insert of claim 1, wherein the dovetail-shaped retaining feature has a bottom side, a first sloped side extending from the bottom side, and a second sloped side extending from the bottom side and located opposite the first sloped side.

8. The insert of claim 7, wherein the first and second sloped sides form respective first and second angles with respect to immediately adjacent sides of about 70-80°.

9. The insert of claim 7, wherein the dovetail-shaped retaining feature forms a recess that is bounded by the bottom side, the first sloped side, and the second sloped side.

10. The insert of claim 7, wherein the dovetail-shaped retaining feature forms a projection that includes the bottom side, the first slope side, and the second sloped side.

11. The insert of claim 1, wherein, when attached to the deburring tool and in an unbiased position, a majority of the inward portion is located below an arbor line formed by a component of the deburring tool, a majority of the central portion is located above the arbor line, and a majority of the outward portion is located below the arbor line.

12. The insert of claim 1, wherein the inward portion and the outward portion are mirror-images of each other so that the insert has a symmetrical shape about a radial line of reflection which goes through the central portion.

13. A connection assembly, comprising:
the insert of claim 1; and
the flexible connection arm having a recess, a terminal end, and a second dovetail-shaped retaining feature located between the recess and the terminal end, wherein when the insert is attached to the flexible connection arm: i) the inward portion of the insert nests within the recess of the flexible connection arm, ii) the first and second dovetail-shaped retaining features mate with each other, and iii) the outward portion of the insert fits over the terminal end of the flexible connection arm.

14. An insert for a deburring tool, comprising:
a retaining feature that attaches the insert to the deburring tool;
a peripheral surface extending around the outside of the insert;
a cutting edge extending along a first section of the peripheral surface and being positioned to contact a workpiece bore so that the cutting edge machines the workpiece bore during operation of the deburring tool; and
an attachment surface extending along a second section of the peripheral surface and being positioned to mate with a component of the deburring tool so that a contact interface is formed between the attachment surface and the component, the attachment surface includes a first portion that is located axially inward of the retaining feature and has an axial length and includes a second portion that is located axially outward of the retaining feature and has a radial height;
wherein the axial length of the first portion is greater than that of the second portion, and the radial height of the second portion is greater than that of the first portion, and an overall length ($L_5$) of the attachment surface is greater than an overall axial length ($L_4$) of the insert.

15. The insert of claim 14, wherein the cutting edge comprises:
a rearward cutting edge that machines a back side opening of the workpiece bore;
a forward cutting edge that machines a front side opening of the workpiece bore; and
a crown located between the rearward and forward cutting edges that does not machine the workpiece bore.

16. The insert of claim 14, wherein the retaining feature is a first dovetail-shaped retaining feature that mates with a second dovetail-shaped retaining feature of the component of the deburring tool, the first dovetail-shaped retaining feature has a bottom side, a first sloped side extending from the bottom side, and a second sloped side extending from the bottom side and located opposite the first sloped side.

17. The insert of claim 14, wherein the overall axial length ($L_4$) of the insert is greater than an overall radial height ($H_5$) of the insert.

18. The insert of claim 14, wherein the overall length ($L_5$) of the attachment surface is greater than an overall radial height ($H_5$) of the insert.

19. A connection assembly, comprising:
the insert of claim 14; and
a connection arm having a second attachment surface shaped complementary to the first attachment surface of the insert and forming the contact interface with the first attachment surface when the insert is attached to the connection arm.

20. A connection assembly for a deburring tool, comprising:
an insert having at least one cutting edge and a first retaining feature, wherein the first retaining feature has a first side, a first sloped side that extends from the first side, and a second sloped side that extends from the first side and is located opposite the first sloped side; and a connection arm having a second retaining feature that mates with the first retaining feature to attach the insert to the connection arm, wherein the second retaining feature has a second side, a third sloped side that extends from the second side, and a fourth sloped side that extends from the second side and is located opposite the third sloped side, the connection arm is pivotally connected in the deburring tool and flexes about a pivot axis to bring the insert to its cutting and noncutting positions during operation of the deburring tool;

when mated, the first and second sides confront each other, the first and third sloped sides confront each other, and the second and fourth sloped sides confront each other.

21. A deburring tool, comprising:

an arbor having a shank portion that is received in a machine to secure the deburring tool to the machine, and a working portion that extends from the shank portion and is inserted in and out of a workpiece bore during operation of the deburring tool; and the connection assembly of claim 20, wherein the connection arm is coupled to the arbor so that the connection arm is located substantially inside of the arbor and the at least one cutting edge is located outside of the working portion to machine the workpiece bore during operation.

* * * * *

UNITED STATES PATENT AND TRADEMARK OFFICE
CERTIFICATE OF CORRECTION

PATENT NO.       : 8,292,553 B2                                  Page 1 of 1
APPLICATION NO.  : 12/480026
DATED            : October 23, 2012
INVENTOR(S)      : William A. Robinson et al.

It is certified that error appears in the above-identified patent and that said Letters Patent is hereby corrected as shown below:

Column 9, claim 10, line 57, after "first", delete "slope" and insert --sloped--

Signed and Sealed this
Twenty-sixth Day of February, 2013

Teresa Stanek Rea
*Acting Director of the United States Patent and Trademark Office*